United States Patent
McBride et al.

(10) Patent No.: US 12,255,870 B2
(45) Date of Patent: Mar. 18, 2025

(54) DOMAIN NAME SYSTEM FOR DATA DISCOVERY

(71) Applicant: Huawei Technologies Co., Ltd., Shenzhen (CN)

(72) Inventors: Michael McBride, Santa Clara, CA (US); Yingzhen Qu, Santa Clara, CA (US); James Neil Guichard, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/314,434

(22) Filed: May 9, 2023

(65) Prior Publication Data

US 2023/0283587 A1 Sep. 7, 2023

Related U.S. Application Data

(63) Continuation of application No. PCT/US2021/055433, filed on Oct. 18, 2021.

(60) Provisional application No. 63/111,416, filed on Nov. 9, 2020.

(51) Int. Cl.
| | |
|---|---|
| *H04L 61/4511* | (2022.01) |
| *H04L 61/5007* | (2022.01) |
| *H04L 9/40* | (2022.01) |
| *H04L 67/1008* | (2022.01) |
| *H04L 67/1023* | (2022.01) |
| *H04L 101/618* | (2022.01) |

(52) U.S. Cl.
CPC ...... *H04L 61/4511* (2022.05); *H04L 61/5007* (2022.05); *H04L 63/0281* (2013.01); *H04L 67/1008* (2013.01); *H04L 67/1023* (2013.01); *H04L 2101/618* (2022.05)

(58) Field of Classification Search
CPC ............. H04L 67/1008; H04L 67/1023; H04L 63/0281

See application file for complete search history.

(56) References Cited

U.S. PATENT DOCUMENTS

| | | | |
|---|---|---|---|
| 7,086,061 B1* | 8/2006 | Joshi | H04L 67/1023 718/105 |
| 7,676,576 B1* | 3/2010 | Kommula | H04L 67/1008 709/225 |
| 2008/0228772 A1* | 9/2008 | Plamondon | G06F 16/9574 |

(Continued)

FOREIGN PATENT DOCUMENTS

EP 2770700 A1 8/2014

OTHER PUBLICATIONS

Bellis, et al., "DNS EDNS Tags," draft-bellis-dnsop-edns-tags-01, Mar. 25, 2019, 6 pages.

(Continued)

*Primary Examiner* — Barbara B Anyan
(74) *Attorney, Agent, or Firm* — Conley Rose, P.C.

(57) ABSTRACT

A method used by a domain name system (DNS) server is disclosed. The DNS server receives a DNS request containing a host name and a resource record specifying data. The DNS server resolves an internet protocol (IP) address based on the host name. The DNS server resolves a server address of a resource server containing the data specified in the resource record. The DNS server transmits a DNS response including the IP address and the server address.

20 Claims, 5 Drawing Sheets

(56) References Cited

U.S. PATENT DOCUMENTS

2012/0096166 A1* 4/2012 Devarapalli ........ H04L 63/0281
709/226

OTHER PUBLICATIONS

Cheshire, et al., "DNS-Based Service Discovery," RFC 6763, Feb. 2013, 49 pages.
Mockapetris, "Domain Names—Implementation and Specification," RFC 1035, Nov. 1987, 55 pages.
Damas, et al., "Extension Mechanisms for DNS (EDNS (0) )," RFC 6891, Apr. 2013, 16 pages.
Cheshire, et al., "Apple's DNS Long-Lived Queries Protocol," RFC 8764, Jun. 2020, 20 pages.
Cheshire, et al., "Dynamic DNS Updated Leases," draft-sekar-dns-ul-01, Aug. 10, 2006, 12 pages.
Austein, "DNS Name Server Identifier (NSID) Option," RFC 5001, Aug. 2007, 11 pages.
Cheshire, et al., "EDNS0 Owner Option," draft-cheshire-edns0-owner-option-01, Jul. 2017, 8 pages.
Crocker, et al., "Signaling Cryptographic Algorithm Understanding in DNS Security Extensions (DNSSEC)," RFC 6975, Jul. 2013, 9 pages.
Contavalli, et al., "Client Subnet in DNS Queries," RFC 7871, May 2016, 30 pages.
Andrews, et al., "Extension Mechanisms for DNS (EDNS) Expire Option," RFC 7314, Jul. 2014, 4 pages.
Eastlake, III, et al., "Domain Name System (DNS) Cookies," RFC 7873, May 2016, 25 pages.
Wouters, et al., "The edns-tcp-keepalive EDNS0 Option," RFC 7828, Apr. 2016, 11 pages.
Mayrhofer, "The EDNS (0) Padding Option," RFC 7830, May 2016, 5 pages.
Wouters, "Chain Query Requests in DNS," RFC 7901, Jun. 2016, 16 pages.
Wessels, et al., "Signaling Trust Anchor Knowledge in DNS Security Extensions (DNSSEC)," Rfc 8145, 13 pages.
Kumari, et al., "Extended DNS Errors," draft-ietf-dnsop-extended-error-16, May 5, 2020, 16 pages.

* cited by examiner

DOMAIN NAME SYSTEM FOR DATA DISCOVERY

CROSS-REFERENCE TO RELATED APPLICATIONS

This patent application is a continuation of International Application No. PCT/US2021/055433, filed Oct. 18, 2021 by Michael McBride, et al., and titled "Domain Name System For Data Discovery," which claims the benefit of U.S. Provisional Patent Application No. 63/111,416, filed Nov. 9, 2020 by Michael McBride, et al., and titled "DNS For Data Discovery (DDD)," which is hereby incorporated by reference.

TECHNICAL FIELD

The present disclosure is generally related to the Domain Name System (DNS) protocol, and is specifically related to a mechanism to using the DNS protocol to locate data in a domain.

BACKGROUND

The Internet operates by assigning Internet Protocol (IP) addresses to the machines operating on the Internet. For example, a server operating on a network domain may receive an IP address. IP version four (IPv4) employs a series of numbers to address the various network domains. Due to the limited number of addresses available in IPv4, IP version six (IPv6) employs both numbers and letters, as well as a larger number of bits, to allow for a larger address space. In many cases, a large number of network devices may operate in a network domain, and not all machines may receive a separate IP address. In such a case, various techniques, such as subnetting and/or network address translation can be employed to address specific machines operating in the network domain based on the domain IP address(es). One issue with the IP addressing system is that IP addresses are not easily retained by human users. Accordingly, domains may be assigned domain names, which are more easily read and understood by human users. Such domain names can be associated with a corresponding IP address. This allows a user to enter a domain name, which can be converted to an IP address to allow the user to communicate with a specific machine on a specific network domain.

SUMMARY

In an embodiment, the disclosure includes a method implemented in a DNS server, the method comprising: receiving, by a receiver of the DNS server, a DNS request containing a host name and a resource record specifying data; resolving, by a processor of the DNS server, an IP address based on the host name; resolving, by the processor, a server address of a resource server containing the data specified in the resource record; and transmitting, by a transmitter of the DNS server, a DNS response including the IP address and the server address.

The DNS system is configured to convert domain names, also known as host names, into IP addresses. In a DNS system, a requestor sends a DNS request to a responder. Generally, the requestor is a client and the responder is a DNS server, such as an authoritative DNS server, a DNS recursive resolver, and/or a DNS stub resolver. The DNS request contains a host name, such as a web address. The DNS server determines an IP address that corresponds to the host name. The DNS server can then reply with a DNS response containing the IP address. Hence, the DNS system can point a requestor to a domain corresponding to a host name. However, the DNS system is not configured to determine the location of specified data within the domain.

The present embodiment includes a mechanism to allow a DNS protocol to locate specified data within a domain. The requestor transmits a DNS request with the host name associated with the domain. The requestor also appends a resource record to the DNS request according to an Extended DNS (EDNS) protocol. The resource record contains an option code field set to a value specifying the resource record is a data resource record. The resource record also contains an option data field set to a value that corresponds to the type of data requested. The responder can then resolve the IP address from the host name and determine an address of a resource server that contains the requested data based on the information in the resource record. The responder can then include both the IP address and the server address in the DNS response by, for example, placing the server address in a resource record attached to the DNS response. Legacy systems that do not support EDNS drop the resource records. Hence, the disclosed mechanism is backwards compatible with legacy systems. As used herein, the requested data can include data values, programs, services, resources, and/or any item on a network that is not assigned an IP address. Accordingly, the disclosed mechanism solves problems that are specific to the data storage and retrieval field. Further, the disclosed mechanism provides a substantial improvement to the functionality of a DNS system and effects a transformation of the DNS server and/or DNS client into a different state.

Optionally, in any of the preceding aspects, another implementation of the aspect provides, wherein the DNS request is received as part of an EDNS protocol.

Optionally, in any of the preceding aspects, another implementation of the aspect provides, wherein the IP address is associated with a domain, and wherein the server address is within the domain associated with the IP address.

Optionally, in any of the preceding aspects, another implementation of the aspect provides, wherein the resource record contains a value that corresponds to the data within the domain.

Optionally, in any of the preceding aspects, another implementation of the aspect provides, wherein resolving the server address further comprises communicating with one or more nameservers to determine a correspondence between the resource record and the server address of the resource server.

Optionally, in any of the preceding aspects, another implementation of the aspect provides, wherein the resource record comprises: an option code field set to a value specifying a type of the resource record, an option length field set to a value specifying a length of the resource record, and an option data field set to a value specifying the data.

Optionally, in any of the preceding aspects, another implementation of the aspect provides, wherein the data includes values, programs, services, resources, or combinations thereof.

In an embodiment, the disclosure includes a method implemented in a DNS client, the method comprising: transmitting, by a transmitter of the DNS client, a DNS request containing a host name and a resource record specifying data; and receiving, by a receiver of the DNS client, a DNS response including an IP address corresponding to the host name and a server address corresponding to the data specified in the resource record.

The DNS system is configured to convert domain names, also known as host names, into IP addresses. In a DNS system, a requestor sends a DNS request to a responder. Generally, the requestor is a client and the responder is a DNS server, such as an authoritative DNS server, a DNS recursive resolver, and/or a DNS stub resolver. The DNS request contains a host name, such as a web address. The DNS server determines an IP address that corresponds to the host name. The DNS server can then reply with a DNS response containing the IP address. Hence, the DNS system can point a requestor to a domain corresponding to a host name. However, the DNS system is not configured to determine the location of specified data within the domain.

The present embodiment includes a mechanism to allow a DNS protocol to locate specified data within a domain. The requestor transmits a DNS request with the host name associated with the domain. The requestor also appends a resource record to the DNS request according to an Extended DNS (EDNS) protocol. The resource record contains an option code field set to a value specifying the resource record is a data resource record. The resource record also contains an option data field set to a value that corresponds to the type of data requested. The responder can then resolve the IP address from the host name and determine an address of a resource server that contains the requested data based on the information in the resource record. The responder can then include both the IP address and the server address in the DNS response by, for example, placing the server address in a resource record attached to the DNS response. Legacy systems that do not support EDNS drop the resource records. Hence, the disclosed mechanism is backwards compatible with legacy systems. As used herein, the requested data can include data values, programs, services, resources, and/or any item on a network that is not assigned an IP address. Accordingly, the disclosed mechanism solves problems that are specific to the data storage and retrieval field. Further, the disclosed mechanism provides a substantial improvement to the functionality of a DNS system and effects a transformation of the DNS server and/or DNS client into a different state.

Optionally, in any of the preceding aspects, another implementation of the aspect provides, wherein the DNS request is transmitted as part of an EDNS protocol.

Optionally, in any of the preceding aspects, another implementation of the aspect provides, wherein the IP address is associated with a domain, and wherein the server address is within the domain associated with the IP address.

Optionally, in any of the preceding aspects, another implementation of the aspect provides, wherein the resource record contains a value that corresponds to the data within the domain.

Optionally, in any of the preceding aspects, another implementation of the aspect provides, wherein the resource record comprises: an option code field set to a value specifying a type of the resource record, an option length field set to a value specifying a length of the resource record, and an option data field set to a value specifying the data.

Optionally, in any of the preceding aspects, another implementation of the aspect provides, wherein the data includes values, programs, services, resources, or combinations thereof.

Optionally, in any of the preceding aspects, another implementation of the aspect provides, further comprising transmitting, by the transmitter, a request for the data, the request directed to a resource server at the server address in a domain of the IP address.

In an embodiment, the disclosure includes a DNS device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a DNS device, the computer program product comprising computer executable instructions stored on the non-transitory computer readable medium such that when executed by a processor cause the DNS device to perform the method of any of the preceding aspects.

In an embodiment, the disclosure includes a DNS server comprising: a receiving means for receiving a DNS request containing a host name and a resource record specifying data; a resolving means for: resolving an IP address based on the host name; and resolving a server address of a resource server containing the data specified in to the resource record; and a transmitting means for transmitting a DNS response including the IP address and the server address.

The DNS system is configured to convert domain names, also known as host names, into IP addresses. In a DNS system, a requestor sends a DNS request to a responder. Generally, the requestor is a client and the responder is a DNS server, such as an authoritative DNS server, a DNS recursive resolver, and/or a DNS stub resolver. The DNS request contains a host name, such as a web address. The DNS server determines an IP address that corresponds to the host name. The DNS server can then reply with a DNS response containing the IP address. Hence, the DNS system can point a requestor to a domain corresponding to a host name. However, the DNS system is not configured to determine the location of specified data within the domain.

The present embodiment includes a mechanism to allow a DNS protocol to locate specified data within a domain. The requestor transmits a DNS request with the host name associated with the domain. The requestor also appends a resource record to the DNS request according to an Extended DNS (EDNS) protocol. The resource record contains an option code field set to a value specifying the resource record is a data resource record. The resource record also contains an option data field set to a value that corresponds to the type of data requested. The responder can then resolve the IP address from the host name and determine an address of a resource server that contains the requested data based on the information in the resource record. The responder can then include both the IP address and the server address in the DNS response by, for example, placing the server address in a resource record attached to the DNS response. Legacy systems that do not support EDNS drop the resource records. Hence, the disclosed mechanism is backwards compatible with legacy systems. As used herein, the requested data can include data values, programs, services, resources, and/or any item on a network that is not assigned an IP address. Accordingly, the disclosed mechanism solves problems that are specific to the data storage and retrieval field. Further, the disclosed mechanism provides a substantial improvement to the functionality of a DNS system and effects a transformation of the DNS server and/or DNS client into a different state.

Optionally, in any of the preceding aspects, another implementation of the aspect provides, wherein the DNS server is further configured to perform the method of any of the preceding aspects.

In an embodiment, the disclosure includes a DNS client comprising: a transmitting means for transmitting a DNS request containing a host name and a resource record specifying data; and a receiving means for receiving a DNS response including an internet protocol (IP) address corresponding to the host name and a server address corresponding to the data specified in the resource record.

The DNS system is configured to convert domain names, also known as host names, into IP addresses. In a DNS system, a requestor sends a DNS request to a responder. Generally, the requestor is a client and the responder is a DNS server, such as an authoritative DNS server, a DNS recursive resolver, and/or a DNS stub resolver. The DNS request contains a host name, such as a web address. The DNS server determines an IP address that corresponds to the host name. The DNS server can then reply with a DNS response containing the IP address. Hence, the DNS system can point a requestor to a domain corresponding to a host name. However, the DNS system is not configured to determine the location of specified data within the domain.

The present embodiment includes a mechanism to allow a DNS protocol to locate specified data within a domain. The requestor transmits a DNS request with the host name associated with the domain. The requestor also appends a resource record to the DNS request according to an Extended DNS (EDNS) protocol. The resource record contains an option code field set to a value specifying the resource record is a data resource record. The resource record also contains an option data field set to a value that corresponds to the type of data requested. The responder can then resolve the IP address from the host name and determine an address of a resource server that contains the requested data based on the information in the resource record. The responder can then include both the IP address and the server address in the DNS response by, for example, placing the server address in a resource record attached to the DNS response. Legacy systems that do not support EDNS drop the resource records. Hence, the disclosed mechanism is backwards compatible with legacy systems. As used herein, the requested data can include data values, programs, services, resources, and/or any item on a network that is not assigned an IP address. Accordingly, the disclosed mechanism solves problems that are specific to the data storage and retrieval field. Further, the disclosed mechanism provides a substantial improvement to the functionality of a DNS system and effects a transformation of the DNS server and/or DNS client into a different state.

Optionally, in any of the preceding aspects, another implementation of the aspect provides, wherein the DNS client is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

The DNS system is used to convert domain names, also known as host names, into IP addresses. In a DNS system, a requestor sends a DNS request to a responder. Generally, the requestor is a client and the responder is a DNS server, such as an authoritative DNS server, a DNS recursive resolver, and/or a DNS stub resolver. The DNS request contains a host name, such as a web address. The DNS server determines an IP address that corresponds to the host name. The DNS server can then reply with a DNS response containing the IP address. Hence, the DNS system can point a requestor to a domain corresponding to a host name. However, the DNS system is not configured to determine the location of specified data within the domain.

Disclosed herein is a mechanism to allow a DNS protocol to locate specified data within a domain. The requestor transmits a DNS request with the host name associated with the domain. The requestor also appends a resource record to the DNS request according to an Extended DNS (EDNS) protocol. The resource record contains an option code field set to a value specifying the resource record is a data resource record. The resource record also contains an option data field set to a value that corresponds to the type of data requested. The responder can then resolve the IP address from the host name and determine an address of a resource server that contains the requested data based on the information in the resource record. The responder can then include both the IP address and the server address in the DNS response by, for example, placing the server address in a resource record attached to the DNS response. Legacy systems that do not support EDNS drop the resource records. Hence, the disclosed mechanism is backwards compatible with legacy systems. As used herein, the requested data can include data values, programs, services, resources, and/or any item on a network that is not assigned an IP address. Accordingly, the disclosed mechanism solves problems that are specific to the data storage and retrieval field. Further, the disclosed mechanism provides a substantial improvement to the functionality of a DNS system and effects a transformation of the DNS server and/or DNS client into a different state.

Figure 1:
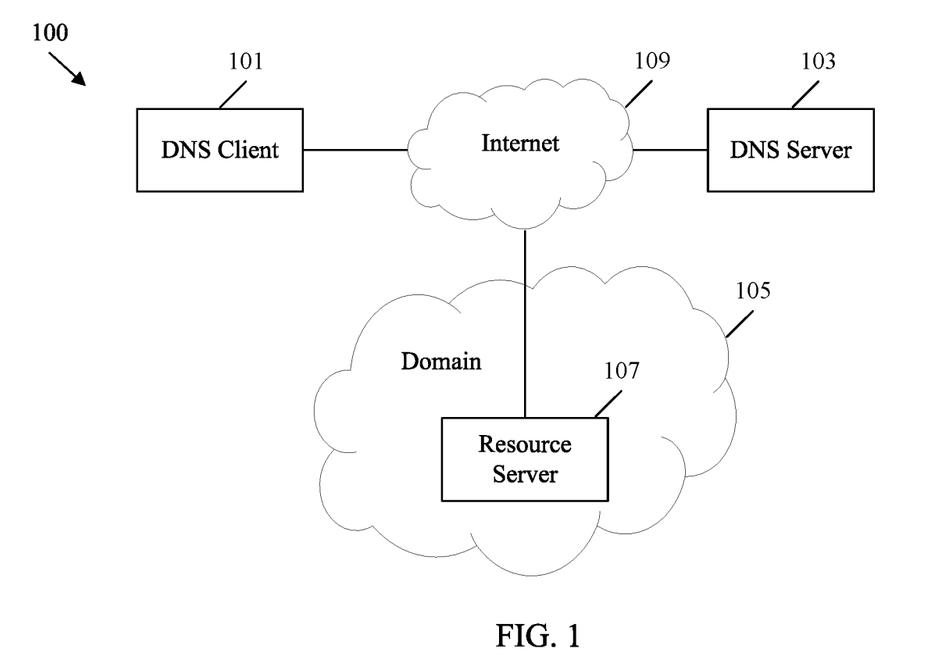
FIG. 1 is a schematic diagram of an example DNS system.

FIG. 1 is a schematic diagram of an example DNS system 100. The DNS system 100 includes a DNS client 101, a resource server 107 in a network domain 105, and a DNS server 103 that communicate via the Internet 109.

A DNS client 101 may be any networked computing device, such as a personal computer, laptop, tablet, smartphone, etc. The DNS client 101 is generally operated by a user, for example via a web browser or other network-based software application. The DNS client 101 acts as a requestor in DNS terminology. This indicates that the DNS client 101 would like to request an IP address that corresponds to a host name. The IP address may be an IPv4 address and/or an IPv6 address, depending on the example. The host name may be any host name usable over the Internet 109, such as www.example.com, where www indicates world wide web, .com indicates a commercial website, and example is a name selected by operators of the network domain 105.

The DNS client 101 transmits a DNS request to the DNS server 103 via the Internet 109. The DNS request contains the host name that corresponds to the network domain 105 and/or resource server 107. The DNS server 103 may be any networked computing device or devices capable of receiving and processing the DNS request. For example, the DNS server 103 may act as a DNS stub resolver, a DNS recursive resolver, a DNS cache, and/or an authoritative DNS server. A DNS stub resolver is a DNS configured device that receives a DNS request from a DNS client 101 and forwards the request to a DNS resolver for resolution. A DNS recursive resolver is a DNS configured device that receives a DNS request from a DNS client 101 and/or a DNS stub resolver. The DNS recursive resolver is then configured to query (e.g., recursively) one or more nameservers storing databases mapping the host name to portions of an IP address. A DNS cache is a DNS configured device that temporarily stores the results of other users DNS requests and response to additional DNS requests without directly querying nameservers when possible. An authoritative DNS server is a DNS configured device that stores database(s) mapping various host names to IP addresses and is capable of resolving an IP address based on local information. As such, a DNS server 103 can be implemented as one or a plurality of network devices that receive a DNS request, resolve a host name into an IP address, and respond to the DNS request with a DNS response containing the host name. Accordingly, the DNS server 103 acts as a responder in DNS terminology. In the DNS context, the term resolve indicates a translation from data indicating a device in a network and an address of the device in the network. For example, a name of the device (e.g., host name) can be resolved into an IP address of the device.

The DNS server 103 forwards the DNS response back to the DNS client 101 over the Internet 109. In the present example, the host name references the network domain 105. Hence, the DNS response contains the IP address of the network domain 105. For example, the IP address may identify a particular server within the network domain 105. A network domain 105 is a group of one or more computer networks and/or hosts within a common administrative and/or hardware infrastructure. In the DNS context, a DNS client 101 can determine an IP address of a device within the network domain 105 so long as the DNS client 101 has the host name of the device and/or network domain 105.

As noted above, the DNS client 101 can use a host name to determine an IP address of a specific machine. However, DNS does not support locating particular data within the network domain 105. Accordingly, the DNS client 101 may find the machine based on IP address, but may not find relevant data when such data is not stored on the machine that relates to the IP address. Extended DNS (EDNS) is a protocol that adds additional functionality to the DNS system 100. Specifically, EDNS allows for resource records to be appended to a DNS request and/or a DNS response. Devices that support EDNS can read the resource records. Devices that do not support EDNS ignore the resource records. As such, EDNS is backwards compatible in the sense that DNS functionality is preserved even when a recipient of an EDNS message is not configured for EDNS.

The present disclosure extends EDNS to support searching for data in a network domain 105. For example, a data resource record can be appended to a DNS request and DNS response. In a specific example, the DNS client 101 is interested in data stored in a resource server 107. The DNS client 101 is aware of the host name and a value associated with the data. The DNS client 101 can then generate the DNS request containing the host name and attach a data resource record containing the value associated with the data. Upon receiving the DNS request, the DNS server 103 can resolve the IP address based on the host name and generate a DNS response containing the IP address. Further, the DNS server 103 can read the value in the data resource record and resolve a location of the data corresponding to the value in the network domain 105. For example, the DNS server 103 can query a nameserver database and determine that the data is stored at the resource server 107. The DNS server 103 can then append address information of the resource server 107 in a data resource record attached to the DNS response. The DNS client 101 can then use the IP address in the DNS response to contact the correct network domain 105 and the address information in the data resource record to contact the correct resource server 107 in the network domain.

As used herein, data can refer to values, programs, services, resources, or combinations thereof. For example, data may reference any software or hardware resource without a dedicated IP address. By way of non-limiting examples, the data may include values such as statistics, measurements, temperature, locations, metadata, system health metrics, etc. The data may also include programs, such as applets, graphics, games, spreadsheets, database systems, browsers, etc. The data may also include services such as firewalls, load-balancers, spam filters, header manipulators, etc. The data may also include system resources such as central processing units (CPU), memory locations, etc. A resource server 107 is therefore any networked computer device that contains data as described above. Accordingly, so long as data is assigned a unique value in a data database, a DNS client 101 can request a DNS server 103 resolve the location of that data within the network domain 105.

In an example, the resource server 107 may be a network edge computing device connected to a control panel of an elevator. In this example, the resource server 107 may be configured to gather and store various sensor data related to the elevator, such as speed, vibration, temperature, etc. In an example, the DNS client 101 may wish to access temperature data related to elevators that are related to the network domain. The DNS client 101 may attach a data resource record to a DNS request with a value associated with elevator temperature. The DNS server 103 can then resolve the DNS request and data resource record to determine that the data related to elevator temperature is located at the resource server 107. The DNS server 103 can then give the DNS client 101 information in the DNS response to locate the resource server 107. The DNS client 101 can then query the resource server 107 in the network domain 105 to obtain the elevator temperature.

In another example, data may be arranged into groups and sub-groups from general to specific. The values for each type of data may then be assigned in a relational manner. For example, a network domain 105 may contain medical data related to allergy/immunology, anesthesiology, cardiology, etc. Each of these groups may be assigned a value. In this example, the allergy/immunology group can be further specified into asthma, eczema, food allergies, insect sting allergies, autoimmune diseases, etc. Each of these subgroups can also be assigned a value. Such values can then be appended in a data resource record to find specified data. For example, a DNS request may contain a data resource record that requests the location of data in the network domain 105 related to asthma in twelve-year-old children under the allergy/immunology category. The DNS server 103 can obtain the values from the data resource record(s), query the relevant database(s), locate the resource server 107 as the device in the network domain 105 that stores such data, and report the results to the DNS client 101 via a DNS response with a data resource record.

In yet another example, the DNS client 101 may be interested in the location of CPUs running specific computing threads, the location of a particular firewall instance, the location of a specific application instance, etc. The DNS client 101 can locate a resource server 107 in the network domain 105 operating any of these items so long as a data value has been assigned to the item. The DNS client 101 adds the data value to the data resource record and the DNS server 103 resolves the location of the item based on the data value. The data values can be defined within the DNS infrastructure as desired, and hence can be used to address and locate any data desired by the operators of the DNS system 100.

It should be noted that, for security reasons, the DNS server 103 may be a private DNS device located behind a firewall. This approach ensures that locating data in the network domain 105 can be restricted to users that are allowed to access such data (e.g., customers of the network domain 105). Further, the DNS server 103 may be located within the network domain 105 in some examples.

Figure 2:
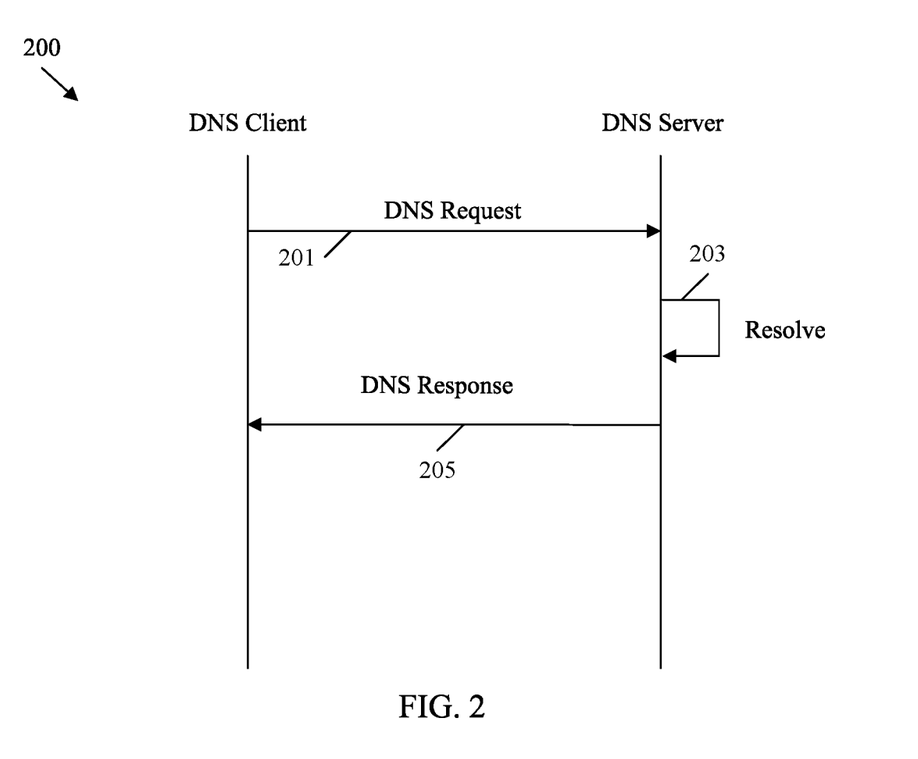
FIG. 2 is a protocol diagram of an example method of employing a DNS system to locate specified data in a domain.

FIG. 2 is a protocol diagram of an example method 200 of employing a DNS system to locate specified data in a domain. For example, the method 200 may be implemented between a DNS client 101 and a DNS server 103 in a DNS system 100. At step 201, the DNS client prepares and sends a DNS request to the DNS server. The DNS request contains a host name for a network domain. The DNS client is interested in specified data within the network domain. Accordingly, the DNS client appends a data resource record to the DNS request. The data resource record contains a value that uniquely identifies the data. The value may be any combination of characters, such as alpha numeric, that can identify the data.

At step 203, the DNS server resolves the IP address and location of the data within the network domain. For example, the DNS server may recursively query one or more nameserver databases to determine the IP address corresponding to the host name. The DNS server may also query an additional nameserver database using the data value to determine the location of the data within the network domain associated with the IP address.

At step 205, the DNS server generates a DNS response and sends the DNS response to the DNS client. The DNS response contains the IP address of the network domain. The DNS response also contains a data resource record that specifies the location of the data within the network domain. The DNS client can then use the information from the DNS response to obtain and/or access the data within the network domain.

Figure 3:
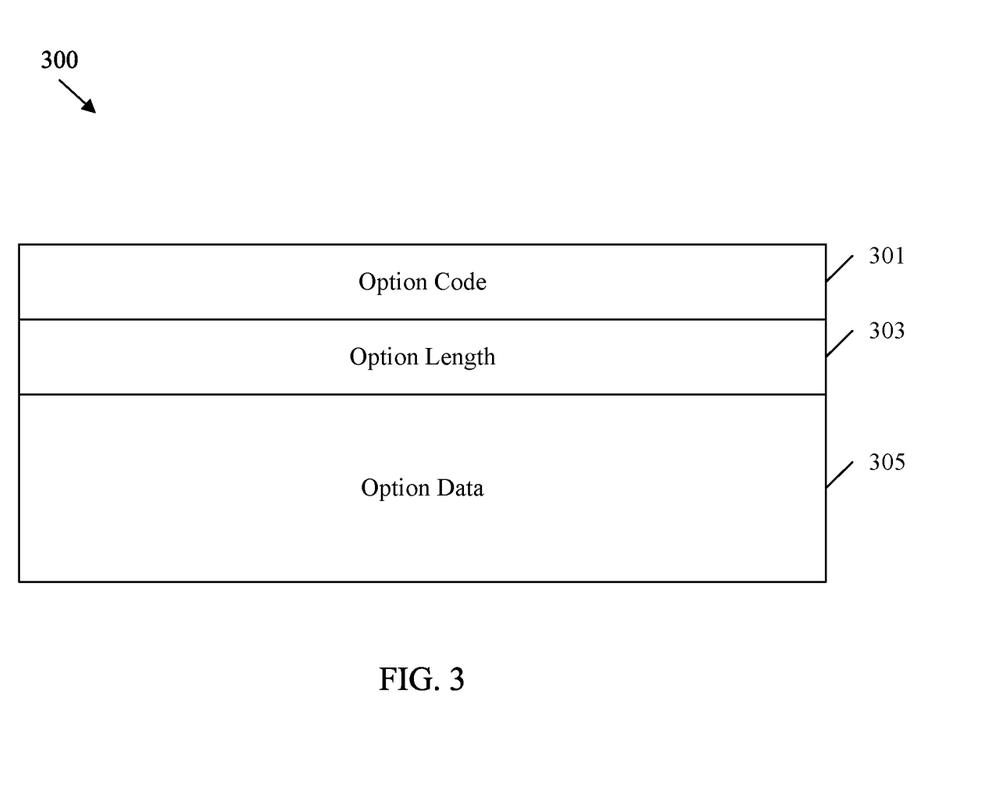
FIG. 3 illustrates an example resource record included in a DNS request.

FIG. 3 illustrates an example resource record 300 included in a DNS request, such as a DNS request and/or DNS response in method 200. Accordingly, a resource record 300 can be used in communication between a DNS client 101 and a DNS server 103 in DNS system 100. The resource record 300 may contain an option code field 301. In an example, the option code field 301 may be sixteen (or thirty-two) bits long and may contain a value specifying the type of the resource record 300. For example, the option code field 301 may contain a value that specifies the resource record 300 is a data resource record. In an example, the option code field 301 may be set to eighteen to specify that the resource record 300 is a data resource record. The resource record 300 may also contain an option length field 303. The option length field 303 may be sixteen (or thirty-two) bits long and may contain a value the length of the resource record 300 in bits. The resource record 300 may also contain an option data field 305. The option data field 305 may be of variable length and may contain one or more data values that correspond to data, where the data location is requested by the user. Accordingly, the resource record 300 uses the option data field 305 to specify data the DNS client is requesting. In an example, the DNS server may also include address information corresponding to the location of the data in the option data field 305 and append the resource record to a DNS response.

Figure 4:
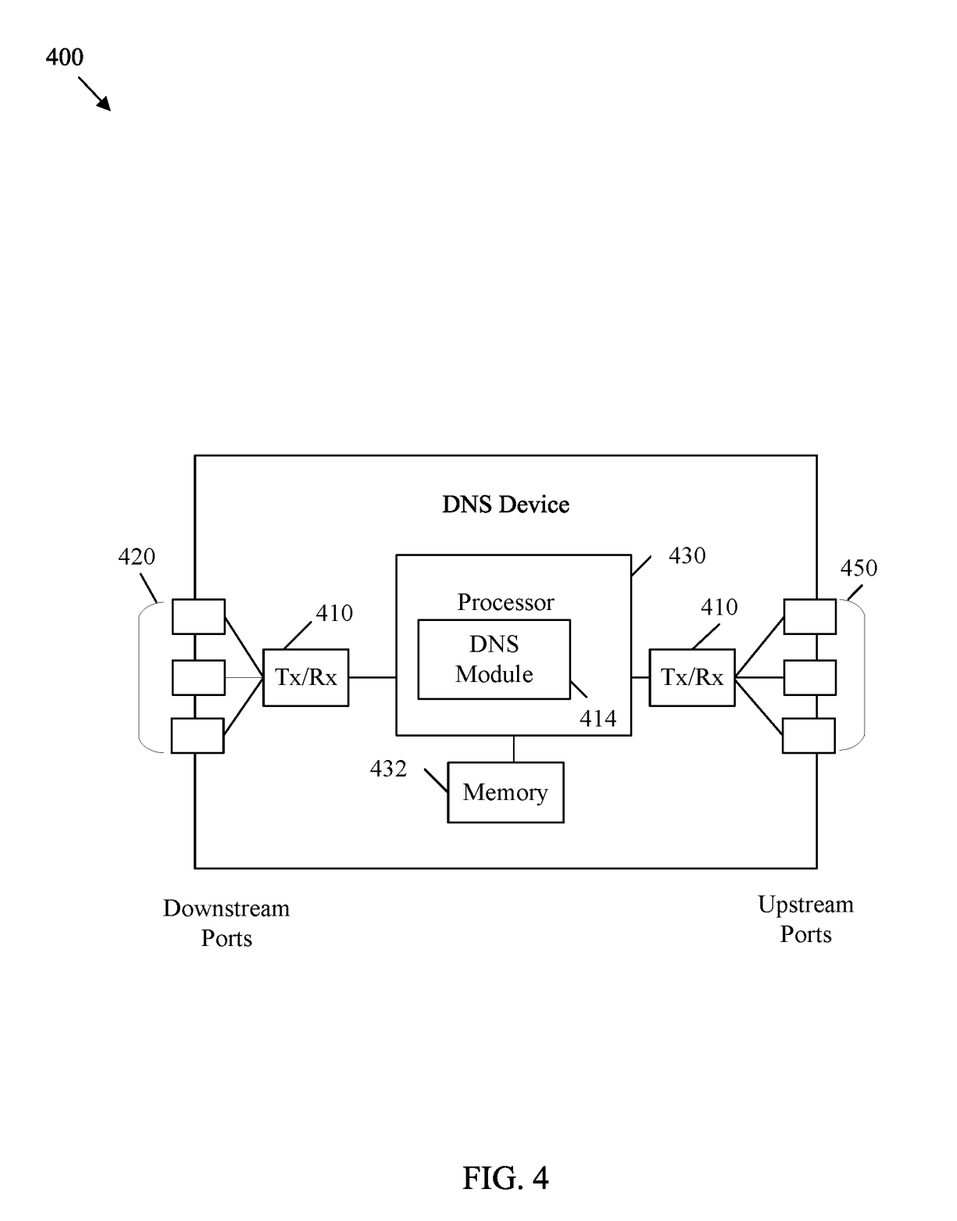
FIG. 4 is a schematic diagram of an example DNS device for locating specified data in a domain.

FIG. 4 is a schematic diagram of an example DNS device 400 for locating specified data in a domain, such as a DNS client 101 and/or a DNS server 103 in DNS system 100. For example, the DNS device 400 can be employed to implement method 200, 500, and/or 600 by employing a resource record 300 in a DNS request. Hence, the DNS device 400 is suitable for implementing the disclosed examples/embodiments as described herein. The DNS device 400 comprises downstream ports 420, upstream ports 450, and/or one or more transceiver units (Tx/Rx) 410, including transmitters and/or receivers for communicating data upstream and/or downstream over a network. The DNS device 400 also includes a processor 430 including a logic unit and/or central processing unit (CPU) to process the data and a memory 432 for storing the data. The DNS device 400 may also comprise optical-to-electrical (OE) components, electrical-to-optical (EO) components, and/or wireless communication components coupled to the upstream ports 450 and/or downstream ports 420 for communication of data via electrical, optical, and/or wireless communication networks.

The processor 430 is implemented by hardware and software. The processor 430 may be implemented as one or more CPU chips, cores (e.g., as a multi-core processor), field-programmable gate arrays (FPGAs), application specific integrated circuits (ASICs), digital signal processors (DSPs), or any combination of the foregoing. The processor 430 is in communication with the downstream ports 420, Tx/Rx 410, upstream ports 450, and memory 432. The processor 430 comprises a DNS module 414. The DNS module 414 may implement one or more of the disclosed embodiments described herein. Specifically, the DNS module 414 may be employed to communicate and/or process a resource record attached to a DNS request, and hence may be capable of employing a DNS request to locate data in a network domain. Accordingly, the DNS module 414 may be configured to perform mechanisms to address one or more of the problems discussed above. As such, the DNS module 414 improves the functionality of the DNS device 400 as well as addresses problems that are specific to the information searching arts. Further, the DNS module 414 effects a transformation of the DNS device 400 to a different state. Alternatively, the DNS module 414 can be implemented as instructions stored in the memory 432 and executed by the processor 430 (e.g., as a computer program product stored on a non-transitory medium).

The memory 432 comprises one or more memory types such as disks, tape drives, solid-state drives, read only memory (ROM), random access memory (RAM), flash memory, ternary content-addressable memory (TCAM), static random-access memory (SRAM), and other optical and/or electrical memory systems suitable for this task. The memory 432 may be used as an over-flow data storage device, to store programs when such programs are selected for execution, and to store instructions and data that are read during program execution.

Figure 5:
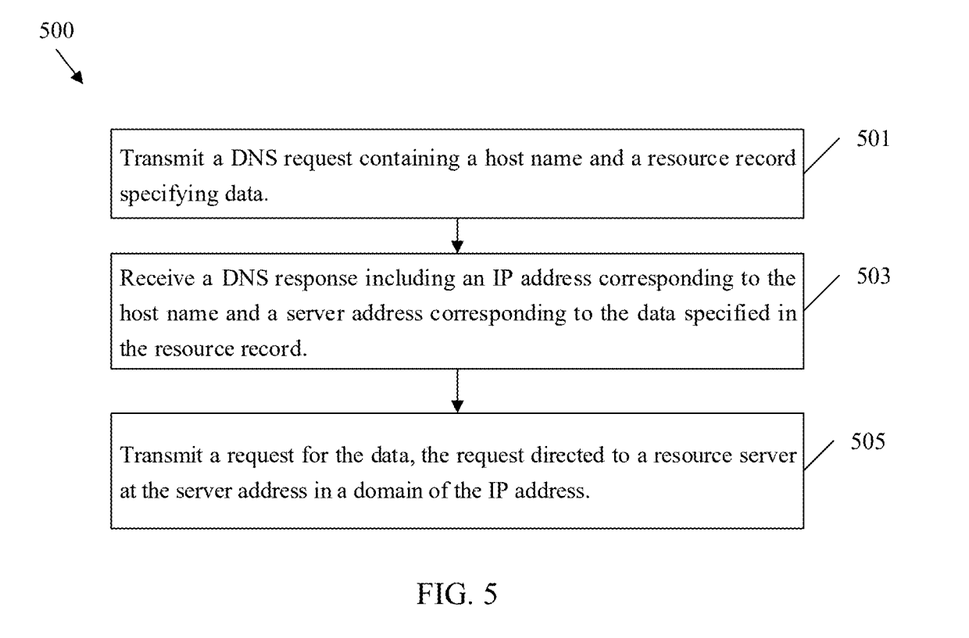
FIG. 5 is a flowchart of an example method of requesting specified data via a DNS request.

FIG. 5 is a flowchart of an example method 500 of requesting specified data via a DNS request. For example, method 500 may be employed to implement method 200. Further, method 500 may be employed by a DNS client 101 to request the location of data in a network domain 105 from a DNS server 103 in DNS system 100. In addition, method 500 may employ a DNS request with a resource record 300. Further, method 500 may be employed by a DNS device 400.

Method 500 may be initiated when a DNS client requests the location of data in a network domain, for example based on user input. Prior to initiating the request, the DNS client may receive a host name of the network domain and a value that specifies the data to be located as input. At step 501, the DNS client generates and transmits a DNS request to a DNS server. The DNS request contains a host name and a resource record specifying the data. In an example, the resource record may comprise an option code field set to a value specifying a type of the resource record, an option length field set to a value specifying a length of the resource record, and an option data field set to a value specifying the data. For example, the resource record may contain a value that corresponds to the data within the domain. The data may include values, programs, services, resources, or combinations thereof. In an example, the DNS request is transmitted as part of an EDNS protocol.

At step 503, the DNS client receives a DNS response including an IP address corresponding to the host name and a server address corresponding to the data specified in the resource record. For example, the IP address may be associated with the network domain, and the server address may be within the network domain of the IP address. The DNS client can then transmit a request for the data at step 505. The request may be directed to a resource server at the server address in the network domain of the IP address.

Figure 6:
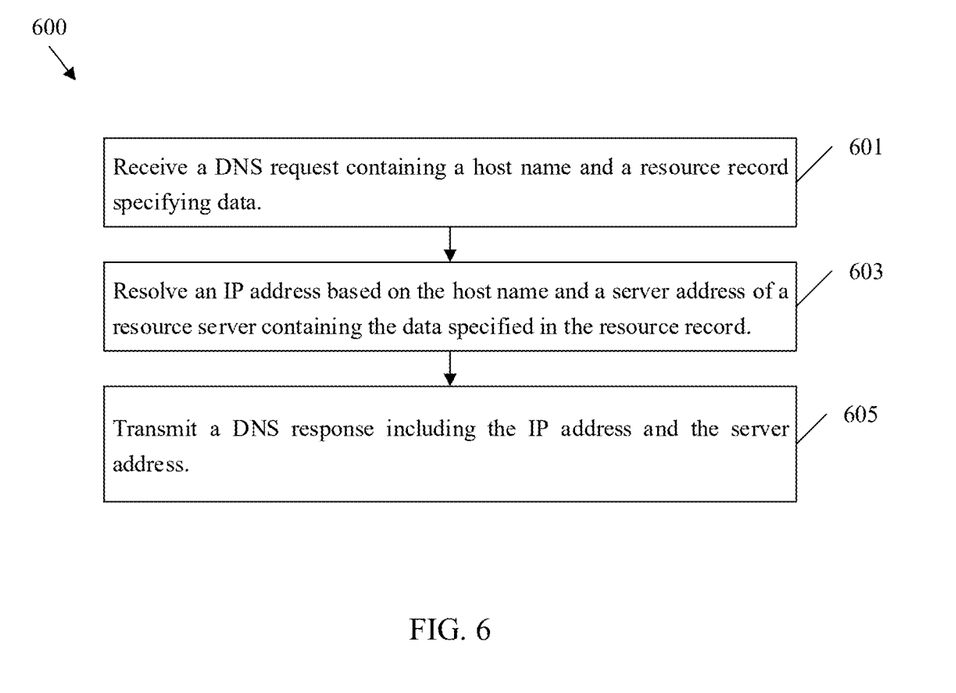
FIG. 6 is a flowchart of an example method of resolving a location of specified data in a domain in response to a DNS request.

FIG. 6 is a flowchart of an example method 600 of resolving a location of specified data in a domain in response to a DNS request. For example, method 600 may be initiated in response to method 500. Further, method 600 may be employed by a DNS server 103 that receives a DNS request with a resource record 300 from a DNS client 101 in DNS system 100. In addition, method 600 may be employed to implement method 200. Also, method 600 may be employed by a DNS device 400.

Method 600 may be initiated when a DNS server receives a DNS request. At step 601, the DNS server receives a DNS request from a DNS client. The DNS request contains a host name and a resource record specifying the data. In an example, the resource record may comprise an option code field set to a value specifying a type of the resource record, an option length field set to a value specifying a length of the resource record, and an option data field set to a value specifying the data. For example, the resource record may contain a value that corresponds to the data within the domain. The data may include values, programs, services, resources, or combinations thereof. In an example, the DNS request is received as part of an EDNS protocol.

At step 603, the DNS server resolves an IP address based on the host name. The DNS server also resolves a server address of a resource server containing the data specified in the resource record. The resolving may be accomplished by querying a local database, communicating with one or more nameservers, and/or querying a separate DNS recursive resolver, depending on the example. The resolving includes querying and/or communicating with a database to determine a correspondence between the host name and the IP address and the correspondence between the resource record and the server address of the resource server. In some examples, the IP address may be associated with a network domain, and the server address of the resource server may be within the network domain of the IP address.

At step 605, the DNS server transmits a DNS response including the IP address and the server address. In some examples, the IP address is included in the DNS response and the server address is attached to the DNS response in a resource record.

Figure 7:
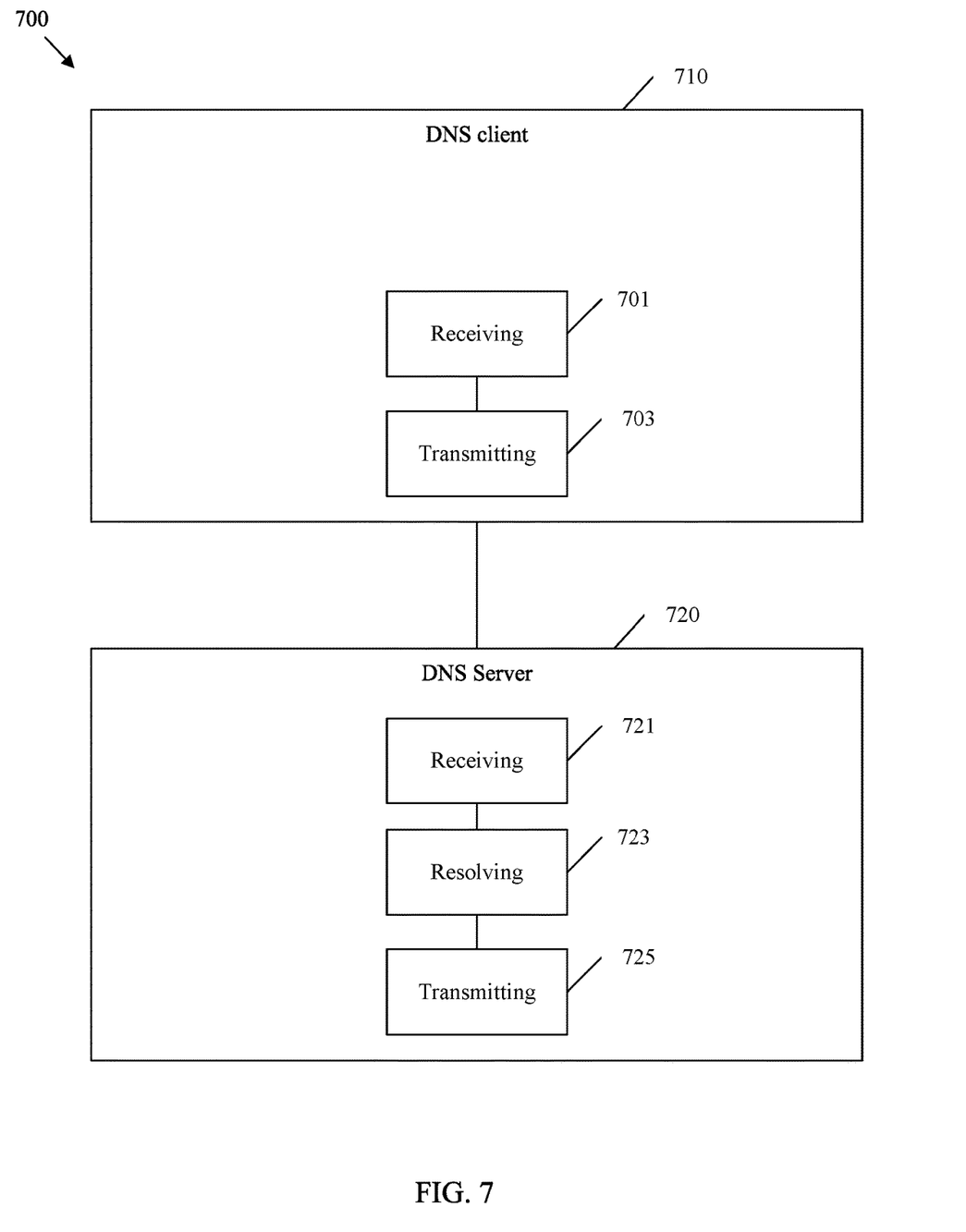
FIG. 7 is a schematic diagram of an example DNS system for locating specified data in a domain.

FIG. 7 is a schematic diagram of an example DNS system 700 for locating specified data in a domain. For example, the DNS system 700 may be implemented by DNS system 100 and/or DNS device 400. Further, the DNS system 700 may be employed to implement method 200, 500, and/or 600 by employing a resource record 300 in a DNS request.

The DNS system 700 may comprise a DNS client 710. The DNS client 710 comprises a transmitting module 703 for transmitting a DNS request containing a host name and a resource record specifying data. The DNS client 710 also comprises a receiving module 701 for receiving a DNS response including an internet protocol (IP) address corresponding to the host name and a server address corresponding to the data specified in the resource record.

The DNS system 700 may also comprise a DNS server 720. The DNS server 720 comprises a receiving module 721 for receiving a DNS request containing a host name and a resource record specifying data. The DNS server 720 also comprises a resolving module 723 for resolving an IP address based on the host name. The resolving module 723 is also for resolving a server address of a resource server containing the data specified in the resource record. The DNS server 720 also comprises a transmitting module 725 for transmitting a DNS response including the IP address and the server address.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in a domain name system (DNS) server, the method comprising:
    receiving a DNS request containing a host name and a resource record specifying data;
    resolving an internet protocol (IP) address based on the host name;
    resolving a server address of a resource server containing the data specified in the resource record; and
    transmitting a DNS response including the IP address and the server address, wherein the resource record includes:
        an option code field set to a value specifying a type of the resource record,
        an option length field set to a value specifying a length of the resource record, and
        an option data field containing the data specified in the DNS request.

2. The method of claim 1, wherein the DNS request is received as part of an extended DNS (EDNS) protocol.

3. The method of claim 1, wherein the IP address is associated with a domain, and wherein the server address is within the domain associated with the IP address.

4. The method of claim 3, wherein the resource record contains a value that corresponds to the data within the domain.

5. The method of claim 1, wherein resolving the server address further comprises communicating with one or more nameservers to determine a correspondence between the resource record and the server address of the resource server.

6. The method of claim 1, wherein the data includes values, programs, services, resources, or combinations thereof.

7. The method of claim 1, wherein the data references one or more resources without a dedicated IP address.

8. A method implemented in a domain name system (DNS) client, the method comprising:
    transmitting a DNS request containing a host name and a resource record specifying data; and
    receiving a DNS response including an internet protocol (IP) address corresponding to the host name and a server address corresponding to the data specified in the resource record, wherein the resource record includes:
        an option code field set to a value specifying a type of the resource record,
        an option length field set to a value specifying a length of the resource record, and
        an option data field containing the data specified in the DNS request.

9. The method of claim 8, wherein the DNS request is transmitted as part of an extended DNS (EDNS) protocol.

10. The method of claim 8, wherein the IP address is associated with a domain, and wherein the server address is within the domain associated with the IP address.

11. The method of claim 10, wherein the resource record contains a value that corresponds to the data within the domain.

12. The method of claim 8, wherein the data includes values, programs, services, resources, or combinations thereof.

13. The method of claim 8, further comprising transmitting a request for the data, the request directed to a resource server at the server address in a domain of the IP address.

14. The method of claim 8, wherein the data references one or more resources without a dedicated IP address.

15. A domain name system (DNS) server comprising:
    a receiver configured to receive a DNS request containing a host name and a resource record specifying data;
    one or more processors coupled to the receiver and configured to:
        resolve an internet protocol (IP) address based on the host name; and
        resolve a server address of a resource server containing the data specified in the resource record; and
    a transmitter coupled to the one or more processors and configured to transmit a DNS response including the IP address and the server address, wherein the resource record includes:
        an option code field set to a value specifying a type of the resource record,
        an option length field set to a value specifying a length of the resource record, and
        an option data field containing the data specified in the DNS request.

16. The DNS server of claim 15, wherein the DNS request is received as part of an extended DNS (EDNS) protocol.

17. The DNS server of claim 16, wherein the IP address is associated with a domain, and wherein the server address is within the domain associated with the IP address.

18. The DNS server of claim 17, wherein the resource record contains a value that corresponds to the data within the domain.

19. The DNS server of claim 18, wherein resolving the server address further comprises communicating with one or more nameservers to determine a correspondence between the resource record and the server address of the resource server.

20. The DNS server of claim 15, wherein the data references one or more resources without a dedicated IP address.

* * * * *